US008422960B2

(12) United States Patent
Yamazaki (10) Patent No.: US 8,422,960 B2
(45) Date of Patent: *Apr. 16, 2013

(54) WIRELESS COMMUNICATION APPARATUS AND WIRELESS COMMUNICATION METHOD

(75) Inventor: Chiharu Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 128 days.

This patent is subject to a terminal disclaimer.

(21) Appl. No.: 12/744,905

(22) PCT Filed: Nov. 10, 2008

(86) PCT No.: PCT/JP2008/070424
§ 371 (c)(1),
(2), (4) Date: Oct. 22, 2010

(87) PCT Pub. No.: WO2009/069459
PCT Pub. Date: Jun. 4, 2009

(65) Prior Publication Data
US 2011/0034131 A1   Feb. 10, 2011

(30) Foreign Application Priority Data
Nov. 29, 2007   (JP) .................................. 2007-308570

(51) Int. Cl.
*H04B 17/00*   (2006.01)
(52) U.S. Cl.
USPC ..................................... 455/67.11; 455/226.1
(58) Field of Classification Search .... 455/67.11–67.16, 455/226.1–226.4, 63.1–63.4
See application file for complete search history.

(56) References Cited

U.S. PATENT DOCUMENTS

| 6,470,194 | B1 | 10/2002 | Miya et al. |
| 6,590,532 | B1 | 7/2003 | Ogawa |
| 7,310,304 | B2 * | 12/2007 | Mody et al. ................... 370/208 |

(Continued)

FOREIGN PATENT DOCUMENTS

| JP | 09-321699 | 12/1997 |
| JP | 2002-043995 | 2/2002 |

(Continued)

OTHER PUBLICATIONS

International Search Report for PCT/JP2008/070424, mailed on Dec. 9, 2008, 1 page.

(Continued)

*Primary Examiner* — Lana N Le
(74) *Attorney, Agent, or Firm* — Duane Morris LLP (57) ABSTRACT

A wireless communication apparatus 100 according to the present invention is provided with a transmission channel coefficient calculation unit 130-1, . . . for calculating a transmission channel coefficient in a transmission frequency band, for each of a plurality of antennas, by extrapolation based on a distribution of reception channel coefficients in a direction of frequency calculated by a reception channel coefficient calculation unit 120-1, . . . , and a transmission channel coefficient correction unit 170-11, . . . , when an absolute value of the transmission channel coefficient calculated by an absolute value calculation unit 140-1, . . . is greater than a threshold calculated by a threshold calculation unit 150 based on the reception channel coefficient as a result of a comparison by a comparison unit 160-1, . . . , for correcting the transmission channel coefficient such that the absolute value is matched with the threshold.

8 Claims, 10 Drawing Sheets

U.S. PATENT DOCUMENTS

| | | | |
|---|---|---|---|
| 7,911,448 B2 | 3/2011 | Uchiyama et al. | |
| 2003/0152159 A1 | 8/2003 | Denno | |
| 2004/0085929 A1 | 5/2004 | Azuma | |
| 2010/0279623 A1* | 11/2010 | Yamazaki et al. | 455/67.11 |
| 2010/0317296 A1* | 12/2010 | Yamazaki | 455/67.11 |
| 2011/0009064 A1* | 1/2011 | Yamazaki et al. | 455/63.1 |

FOREIGN PATENT DOCUMENTS

| | | |
|---|---|---|
| JP | 2003-032167 | 1/2003 |
| JP | 2004-343282 | 12/2004 |
| JP | 3644594 | 2/2005 |
| JP | 2005-86444 | 3/2005 |
| JP | 2007-124553 | 5/2007 |
| WO | WO-00/79702 | 12/2000 |
| WO | WO-2006-075547 | 7/2006 |
| WO | WO-2007-142313 | 12/2007 |

OTHER PUBLICATIONS

PCT/US2008/072131 International Search Report mailed Feb. 3, 2009.

PCT/JP2008/070420 International Search Report mailed Dec. 9, 2008.

PCT/JP2008/067304 International Search Report mailed Dec. 16, 2008.

CN200880117740.6 Office Action mailed Jun. 5, 2012.

CN200880108445.4 Office Action mailed Sep. 5, 2012.

JP-547014/2009 Notification of Reasons for Refusal mailed Oct. 4. 2011.

Detailed First Office Action (including translation) for CN 200880117619.3, mailed Jun. 5, 2012, 5 pages.

* cited by examiner

WIRELESS COMMUNICATION APPARATUS AND WIRELESS COMMUNICATION METHOD

CROSS REFERENCE TO RELATED APPLICATIONS

This application is a U.S. National Phase Application of International Application No. PCT/JP2008/070424 (filed on Nov. 10, 2008), which claims priority to and the benefit of Japanese Patent Application No. 2007-308570 (filed on Nov. 29, 2007), the disclosures of which are incorporated herein by reference in their entirety.

TECHNICAL FIELD

The present invention relates to wireless communication apparatus having a plurality of antennas, and wireless communication methods of controlling wireless communication between a wireless communication apparatus having a plurality of antennas and a counterpart wireless communication apparatus.

BACKGROUND ART

Figure 10:
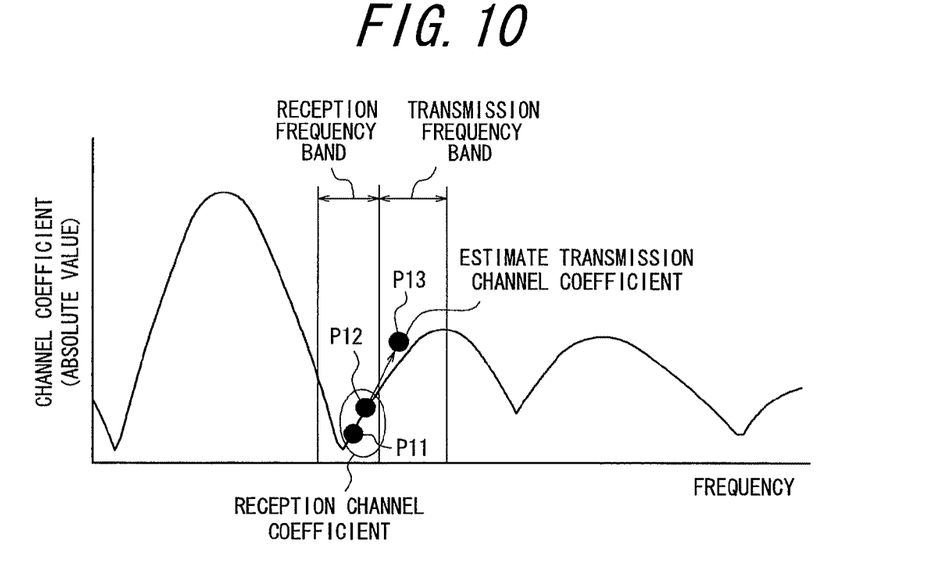
FIG. 10 is a diagram for explaining a conventional art to estimate the transmission channel coefficient by an extrapolation process.

As an adaptive control of an array weight in a transmission frequency band performed by a wireless communication apparatus having a plurality of antennas, there is a method to calculate the array weight by estimating a channel coefficient in the transmission frequency band by an extrapolation process such as a linear extrapolation based on a distribution of the channel coefficients in a reception frequency band in a direction of frequency (for example, Patent Document 1). More specifically, when a reception channel coefficient (absolute value) changes from a point p11 to a point p12 shown in FIG. 10, it is estimated (calculated) that a transmission channel coefficient (absolute value) is at a point p13 in FIG. 10, based on the change of the reception channel coefficient.

Patent Document 1: Japanese Patent No. 3644594

SUMMARY OF INVENTION

Technical Problem

Figure 11:
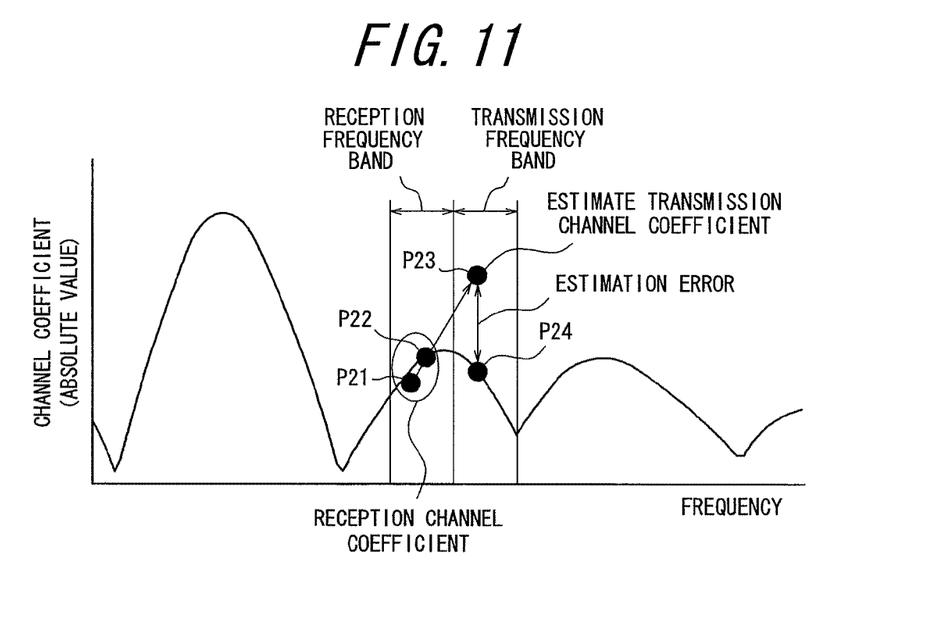
FIG. 11 is a diagram for explaining a significant estimation error by the conventional art to estimate the transmission channel coefficient by the extrapolation process.

However, when the transmission channel coefficient is estimated by the extrapolation process according to the above conventional art, it may cause a great difference between the transmission channel coefficient estimated and an actual transmission channel coefficient due to fluctuation conditions of the reception channel coefficient. For example, when the reception channel coefficient (absolute value) changes from a point p21 to a point p22 as shown in FIG. 11 and the transmission channel coefficient (absolute value) is estimated (calculated) to be at a point p23 in FIG. 11 based on the change of the reception channel coefficient, an actual transmission channel coefficient (absolute value) may be, however, at a point p24 in FIG. 11, which causes a significant estimation error correspondingly to a difference between the points p23 and p24 as shown in the figure.

An object of the present invention is to provide techniques (wireless communication apparatus and wireless communication methods) which improve calculation accuracy of transmission channel coefficients in a transmission frequency band when transmission channel coefficients in the transmission frequency band are calculated from reception channel coefficients in a reception frequency band, by correcting an absolute value of a transmission channel coefficient which is considered to occur with a low probability among absolute values of the transmission channel coefficients calculated.

Solution to Problem

In order to achieve the above object, a wireless communication apparatus having a plurality of antennas according to the present invention includes: a reception channel coefficient calculation unit for calculating a reception channel coefficient in a reception frequency band, for each of the plurality of antennas; a transmission channel coefficient calculation unit for calculating a transmission channel coefficient in a transmission frequency band, for each of the plurality of antennas, by extrapolation based on a distribution of reception channel coefficients calculated by the reception channel coefficient calculation unit in a direction of frequency; and a correction unit, when an absolute value of the transmission channel coefficient is greater than a threshold calculated based on the reception channel coefficient, for correcting the transmission channel coefficient calculated by the transmission channel coefficient calculation unit such that the absolute value is matched with the threshold.

The wireless communication apparatus according to one embodiment of the present invention is characterized in that the correction unit corrects the absolute value of the transmission channel coefficient while holding a phase component of the transmission channel coefficient calculated by the transmission channel coefficient calculation unit.

The wireless communication apparatus according to another embodiment of the present invention is characterized in further including an extrapolation distance calculation unit for calculating an extrapolation distance based on the reception channel coefficient calculated by the reception channel coefficient calculation unit, the transmission channel coefficient calculated by the transmission channel coefficient calculation unit and the threshold, and the correction unit corrects the transmission channel coefficient calculated by the transmission channel coefficient calculation unit based on the extrapolation distance calculated by the extrapolation distance calculation unit and the reception channel coefficient calculated by the reception channel coefficient calculation unit.

The wireless communication apparatus according to yet another embodiment of the present invention is characterized in further including a channel coefficient memory unit for storing reception channel coefficients at a plurality of time points, for each of the plurality of antennas, calculated by the reception channel coefficient calculation unit, and the threshold is calculated based on the reception channel coefficients at the plurality of time points stored in the channel coefficient memory unit.

The wireless communication apparatus according to yet another embodiment of the present invention is characterized in that the threshold is calculated for each of the plurality of antennas, and the correction unit corrects the transmission channel coefficient based on a result of a comparison between the threshold of each of the plurality of antennas and the absolute value of each of the plurality of antennas.

The wireless communication apparatus according to yet another embodiment of the present invention is characterized in further including a transmission power information obtain unit for obtaining transmission power information of a counterpart wireless communication apparatus and a reception channel coefficient correction unit for correcting the reception channel coefficient calculated by the reception channel coefficient calculation unit, and the reception channel coefficient correction unit corrects the reception channel coefficient calculated by the reception channel coefficient calculation unit, based on the transmission power information obtained by the transmission power information obtain unit.

The wireless communication apparatus according to yet another embodiment of the present invention is characterized in being used for a system in which the transmission frequency band and the reception frequency band are different from each other.

In order to achieve the above object, a wireless communication method according to the present invention, for controlling wireless communication between a wireless communication apparatus having a plurality of antennas and a counterpart wireless communication apparatus, includes: a reception channel coefficient calculation step for calculating a reception channel coefficient in a reception frequency band, for each of the plurality of antennas; a transmission channel coefficient calculation step for calculating a transmission channel coefficient in a transmission frequency band, for each of the plurality of antennas, by extrapolation based on a distribution of reception channel coefficients calculated at the reception channel coefficient calculation step in a direction of frequency; and a correction step, when an absolute value of the transmission channel coefficient is greater than a threshold calculated based on the reception channel coefficient, for correcting the transmission channel coefficient calculated at the transmission channel coefficient calculation step such that the absolute value is matched with the threshold.

Advantageous Effects on Invention

According to the present invention, when an absolute value of a transmission channel coefficient is greater than a threshold, the correction unit corrects the transmission channel coefficient calculated by the transmission channel coefficient calculation unit, based on a difference value calculated by the difference value calculation unit. Therefore, an absolute value of the transmission channel coefficient, which is considered to occur with a low probability among absolute values of transmission channel coefficients calculated, is corrected. It is thus possible to reduce a calculation error (estimation error) of the transmission channel coefficient. Accordingly, it is possible to provide techniques (wireless communication apparatus and wireless communication methods) which improve calculation accuracy of the transmission channel coefficient in the transmission frequency band.

DESCRIPTION OF EMBODIMENTS

Embodiments of the present invention will be described with reference to the accompanying drawings.

[First Embodiment]

Figure 1:
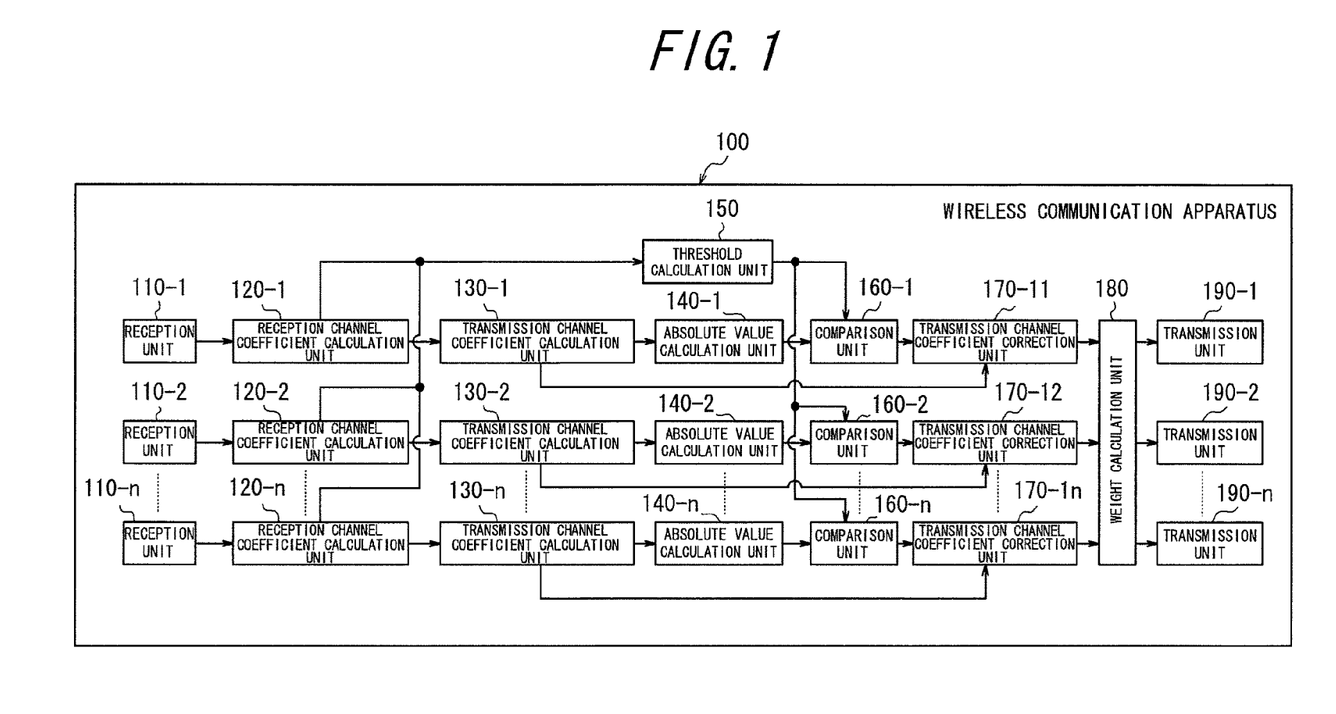
FIG. 1 is a block diagram illustrating a schematic constitution of a wireless communication apparatus according to a first embodiment applying a wireless communication method of the present invention.

FIG. 1 is a block diagram illustrating a schematic constitution of a wireless communication apparatus according to a first embodiment applying a wireless communication method of the present invention. A wireless communication apparatus 100 according to the present embodiment is a wireless communication apparatus (hereinafter referred to also as a base station) having a plurality of antennas (not shown).

The wireless communication apparatus 100 is provided with reception units 110-1 and 110-2 to 110-$n$ for receiving radio signals transmitted from a counterpart wireless communication apparatus (not shown, hereinafter referred to also as a terminal) via the plurality of antennas, reception channel coefficient calculation units 120-1 and 120-2 to 120-$n$ for calculating reception channel coefficients in a reception frequency band (reception channel coefficients in the reception frequency band of the respective plurality of antennas) in relation to the counterpart wireless communication apparatus based on the signals received by the reception units 110-1 and 110-2 to 110-$n$, transmission channel coefficient calculation units 130-1 and 130-2 to 130-$n$ for calculating (estimating) transmission channel coefficients in a transmission frequency band (transmission channel coefficients in the transmission frequency band of the respective plurality of antennas) in relation to the counterpart wireless communication apparatus based on a distribution of the reception channel coefficients in a direction of frequency calculated by the reception channel coefficient calculation units 120-1 and 120-2 to 120-$n$, absolute value calculation units 140-1 and 140-2 to 140-$n$ for calculating absolute values of the transmission channel coefficients calculated by the transmission channel coefficient calculation units 130-1 and 130-2 to 130-$n$, a threshold calculation unit 150 for calculating a threshold based on the reception channel coefficients calculated by the reception channel coefficient calculation units 120-1 and 120-2 to 120-n, comparison units 160-1 and 160-2 to 160-n for comparing the absolute value calculated by the absolute value calculation units 140-1 and 140-2 to 140-n and the threshold calculated by the threshold calculation unit 150, transmission channel coefficient correction units 170-11 and 170-12 to 170-1n for correcting the transmission channel coefficients calculated by the transmission channel coefficient calculation units 130-1 and 130-2 to 130-n, a weight calculation unit 180 for calculating weights based on the transmission channel coefficients corrected by the transmission channel coefficient correction units 170-11 and 170-12 to 170-1n, and transmission units 190-1 and 190-2 to 190-n for transmitting radio signals, based on the transmission channel coefficients corrected by the transmission channel coefficient correction units 170-11 and 170-12 to 170-1n and the weights calculated by the weights calculation unit 180, via the plurality of antennas.

It is to be noted that although the wireless communication apparatus (base station) of the present invention and the wireless communication method of the present invention are preferably applicable to a system in which the transmission frequency band and the reception frequency band are different from each another (for example, FDD system; Frequency Division Duplex system), the wireless communication apparatus and the wireless communication method of the present invention are not limited to the above system but applicable to other systems.

The threshold calculation unit 150 calculates a greatest absolute value, among absolute values of the reception channel coefficients calculated by the reception channel coefficient calculation units 120-1 and 120-2 to 120-n, as the threshold.

The transmission channel coefficient correction units 170-11 and 170-2 to 170-1n, when the absolute values are greater than the threshold as results of comparisons by the comparison units 160-1 and 160-2 to 160-n, correct the transmission channel coefficients calculated by the transmission channel coefficient calculation units 130-1 to 130-n, respectively, such that the absolute values are matched with the threshold.

Next, a correcting operation of the transmission channel coefficient according to the first embodiment is described with reference to FIG. 2.

Under circumstances with a number of scattering objects such as in an urban area, channel coefficients (the reception channel coefficient and the transmission channel coefficient) between the wireless communication apparatus (base station) 100 and the counterpart wireless communication apparatus (terminal) independently fluctuate in accordance with Rayleigh distribution. In such a condition, if there is no great change in a distance between the wireless communication apparatus (base station) 100 and the counterpart wireless communication apparatus, transmission power from the counterpart wireless communication apparatus or arrangement of the scattering objects around the wireless communication apparatus 100, there is a very low probability for the absolute value of the transmission channel coefficient greater than a certain value to occur. Whereas, when the transmission channel coefficient in the transmission frequency band is estimated (calculated) by linear extrapolation and the likes, there is "a case where a transmission channel coefficient greater than a certain absolute value is calculated (hereinafter referred to as a case 1)", although a possibility for such a transmission channel coefficient in the transmission frequency band to be made is very low.

Figure 2:
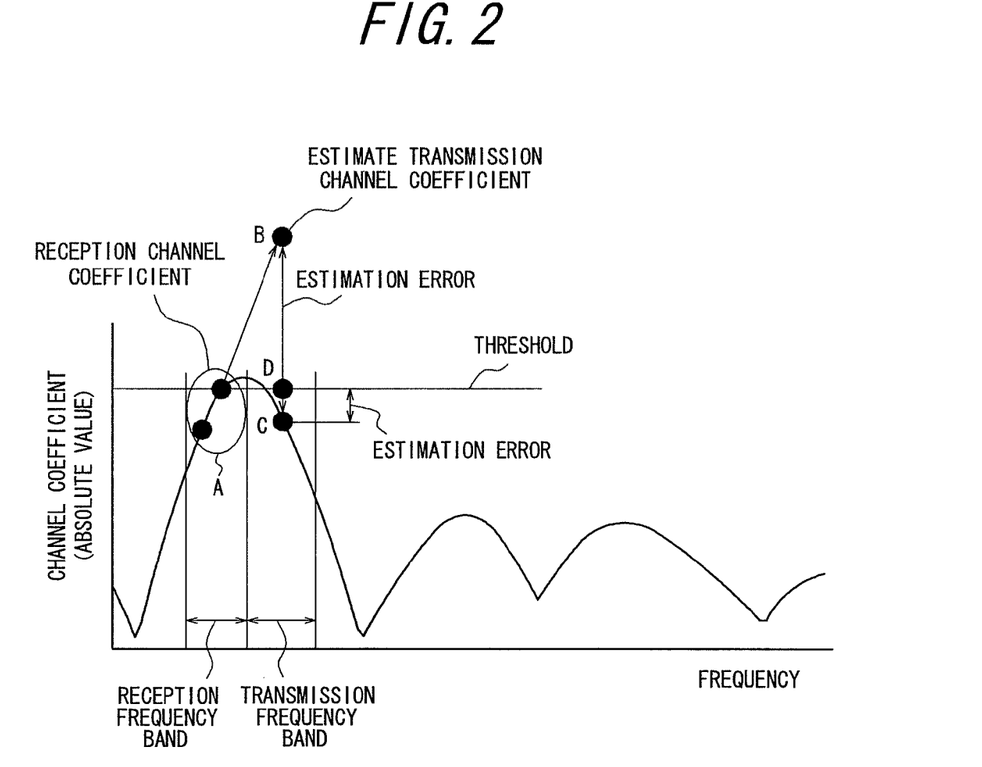
FIG. 2 is a diagram illustrating an example of a distribution of reception channel coefficients and transmission channel coefficients in a direction of frequency, for explaining a correcting operation of the transmission channel coefficient according to the first embodiment.

Such a calculation (estimation) of the transmission channel coefficient as the above case 1 means that the transmission channel coefficient in the transmission frequency band is estimated (calculated) as a point B in FIG. 2 from the distribution of the reception channel coefficients in the reception frequency band shown as a part A in FIG. 2. In this case, if a point C in FIG. 2 is a transmission channel coefficient which should be estimated originally, an estimation error between an "actual transmission channel coefficient" and an "estimated (calculated) transmission channel coefficient" corresponds to a distance between the point B and the point C, which is a significant estimation error.

As a countermeasure, the transmission channel coefficient correction units 170-11 and 170-12 to 170-1n, when the transmission channel coefficients such as the point B as shown in FIG. 2 are estimated (calculated), correct the absolute values of the transmission channel coefficients calculated by the transmission channel coefficient calculation units 130-1 and 130-2 to 130-n such that the absolute values are matched with the threshold calculated by the threshold calculation unit 150 (namely, so as to return them to a point D in FIG. 2 which corresponds to the threshold). Thereby, the estimation error is minimized to a distance between the point D and the point C.

According to the first embodiment, it is possible to reduce the calculation error (estimation error) of the transmission channel coefficient, by correcting the absolute value of the transmission channel coefficient, which is considered to occur with a low probability, among the absolute values of the transmission channel coefficients calculated (estimated) by extrapolation (the linear extrapolation, for example). Since the calculation error (estimation error) of the transmission channel coefficient is minimized, it is possible to improve the calculation accuracy (estimation accuracy) of the transmission channel coefficient in the transmission frequency band. Hence, it is possible to obtain good communication quality by preventing deterioration of communication quality caused by a significant difference between the uplink and downlink frequencies due to broadbandization in communications.

[Second Embodiment]

Figure 3:
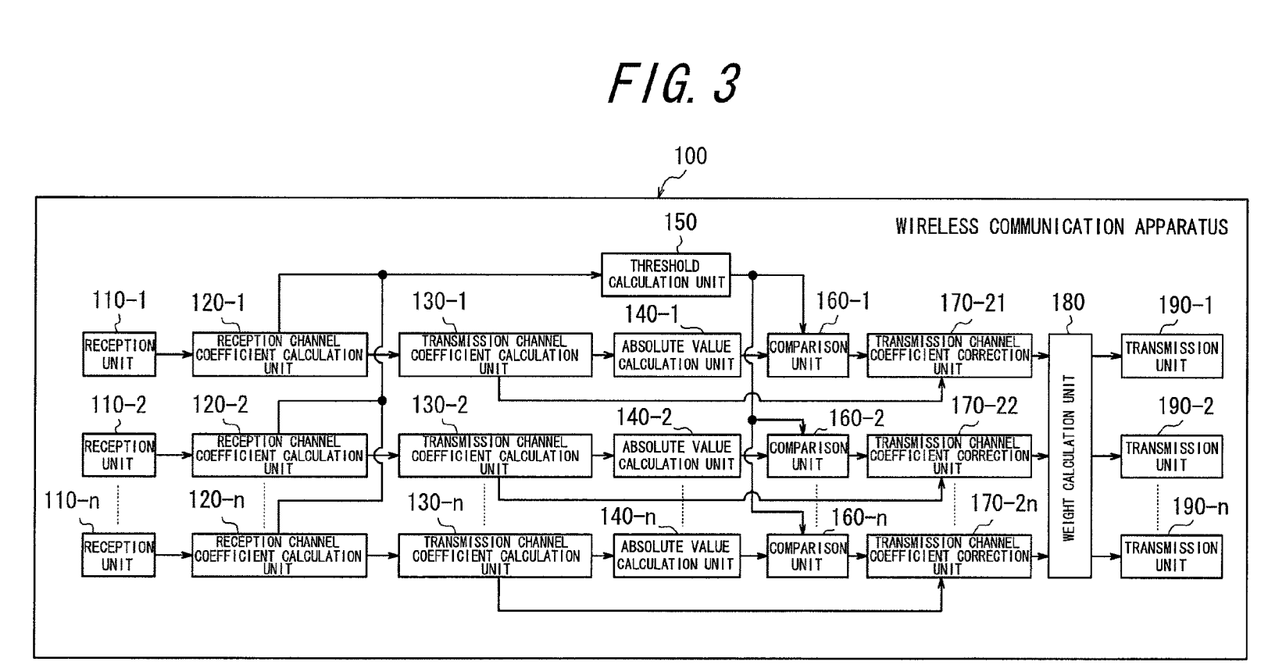
FIG. 3 is a block diagram illustrating a schematic constitution of a wireless communication apparatus according to a second embodiment applying the wireless communication method of the present invention.

FIG. 3 is a block diagram illustrating a schematic constitution of a wireless communication apparatus according to a second embodiment applying the wireless communication method of the present invention. A wireless communication apparatus 100 according to the present embodiment has the same constitution as the wireless communication apparatus 100 in the above first embodiment, except for having transmission channel coefficient correction units 170-21 and 170-22 to 170-2n in place of the transmission channel coefficient correction units 170-11 and 170-12 to 170-1n.

When the absolute values are greater than the threshold as results of comparisons by the comparison units 160-1 and 160-2 to 160-n, the transmission channel coefficient correction units 170-21 and 170-22 to 170-2n correct the transmission channel coefficients calculated by the transmission channel coefficient calculation units 130-1 and 130-2 to 130-n, respectively, based on the following Formula (1). At this time, the transmission channel coefficient correction units 170-11 and 170-12 to 170-1n correct the absolute values of the transmission channel coefficients while holding phase components of the transmission channel coefficients calculated by the transmission channel coefficient calculation units 130-1 and 130-2 to 130-n.

[Formula 1]

$$\hat{H}_i = H_i \times (A/|H_i|) \tag{1}$$

provided that
$\hat{H}_i$: complex channel coefficient after correction
$H_i$: complex channel coefficient before correction
A: threshold

||: absolute value operation

Next, the correcting operation of the transmission channel coefficient according to the second embodiment is described with reference to FIG. 4.

Figure 4:
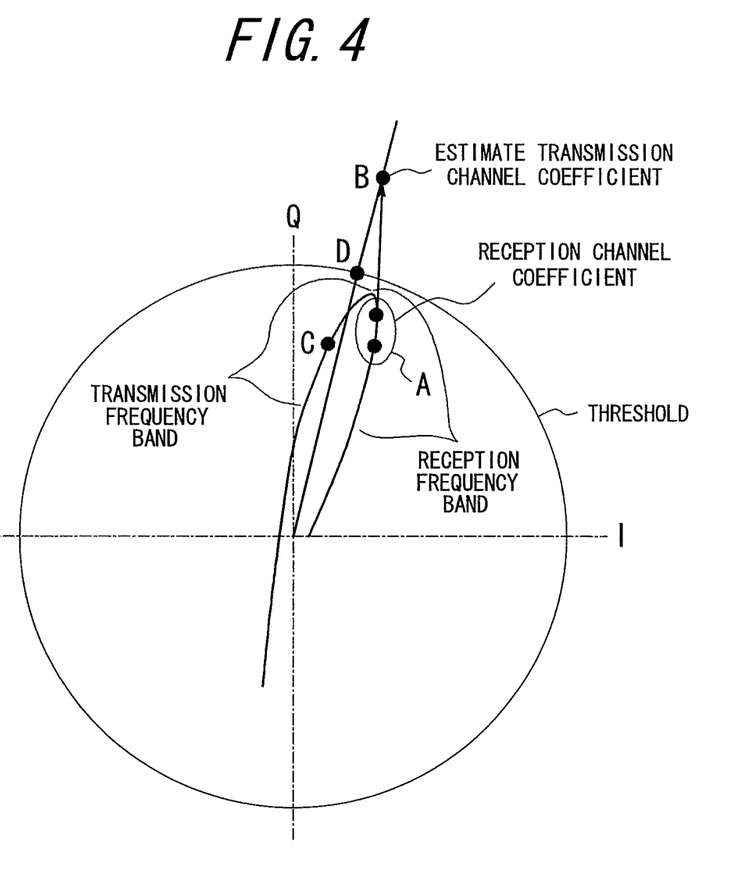
FIG. 4 is a diagram illustrating an example of the distribution of the reception channel coefficients and the transmission channel coefficients in the direction of frequency on a complex plane, for explaining a correcting operation of the transmission channel coefficient according to the second embodiment.

Such a calculation (estimation) of the transmission channel coefficient as the above case 1 means that the transmission channel coefficient in the transmission frequency band is estimated (calculated) as a point B in FIG. 4 from a distribution of the reception channel coefficients in the reception frequency band shown as a part A in FIG. 4. In this case, if a point C in FIG. 4 is a transmission channel coefficient which should be estimated originally, the estimation error between the "actual transmission channel coefficient" and the "estimated (calculated) transmission channel coefficient" corresponds to the distance between the point B and the point C, which is a significant estimation error.

As the countermeasure, the transmission channel coefficient correction units 170-21 and 170-22 to 170-2n, when the estimation (calculation) of the transmission channel coefficients such as the point B as shown in FIG. 4 are made, correct the transmission channel coefficients calculated by the transmission channel coefficient calculation units 130-1 and 130-2 to 130-n (namely, correct them to a point D in FIG. 4 which corresponds to the threshold), using the formula (1) based on "a ratio between the absolute value of the transmission channel coefficient and the threshold calculated by the threshold calculation unit 150", while holding phase components of the transmission channel coefficients. Thereby, it is possible to minimize the estimation error to the distance between the point D and the point C.

According to the second embodiment, it is possible to reduce the calculation error (estimation error) of the transmission channel coefficient, by correcting the absolute value of the transmission channel coefficient, which is considered to occur with a low probability, among the absolute values of the transmission channel coefficients calculated (estimated) by extrapolation (the linear extrapolation, for example), in consideration of a phase fluctuation on the channel. Since the calculation error (estimation error) of the transmission channel coefficient is minimized, it is possible to improve the calculation accuracy (estimation accuracy) of the transmission channel coefficient in the transmission frequency band. Hence, it is possible to obtain good communication quality by preventing deterioration of communication quality caused by the significant difference between the uplink and downlink frequencies due to broadbandization in communications.

[Third Embodiment]

Figure 5:
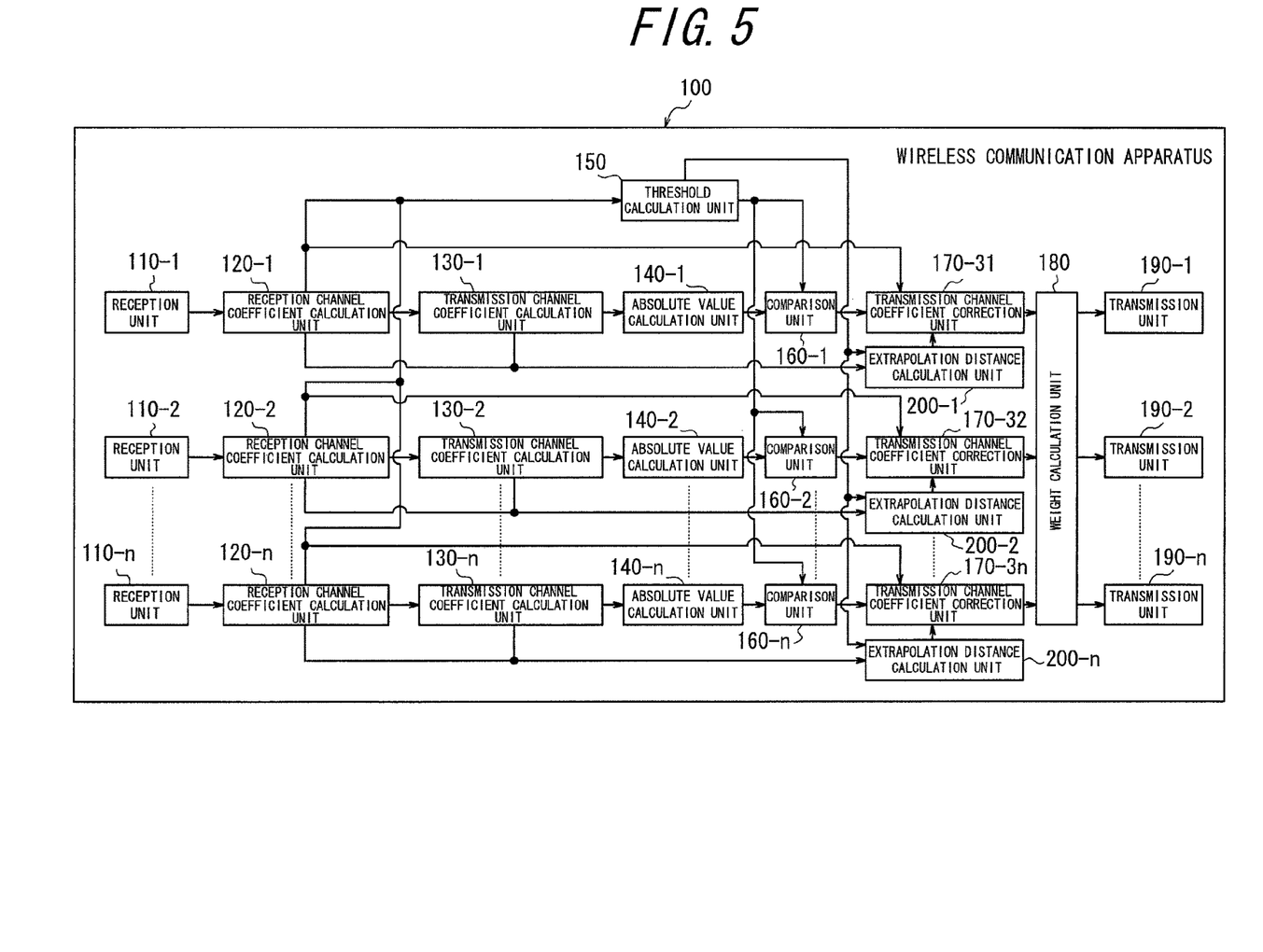
FIG. 5 is a block diagram illustrating a schematic constitution of a wireless communication apparatus according to a third embodiment applying the wireless communication method of the present invention.

FIG. 5 is a block diagram illustrating a schematic constitution of a wireless communication apparatus according to a third embodiment applying the wireless communication method of the present invention. A wireless communication apparatus 100 according to the present embodiment has the same constitution as the wireless communication apparatus 100 of the first embodiment, except for having extrapolation distance calculation units 200-1 and 200-2 to 200-n in addition, and transmission channel coefficient correction units 170-31 and 170-32 to 170-3n in place of the transmission channel coefficient correction units 170-11 and 170-12 to 170-1n.

The extrapolation distance calculation units 200-1 and 200-2 to 200-n calculate extrapolation distances based on the reception channel coefficients, the transmission channel coefficients and the threshold, so as to satisfy the following formula (2).

[Formula 2]

$$\left| H_i + \left( L \times \frac{dH_i}{df} \right) \right| = A \quad (2)$$

provided that
L: extrapolation distance
$H_i$: complex channel coefficient in reception frequency band
$dH_i/df$ variation of complex channel coefficient in reception frequency band in direction of frequency
||: absolute value operation
A: threshold When the absolute values are greater than the threshold as results of the comparisons by the comparison units 160-1 and 160-2 to 160-n, the transmission channel coefficient correction units 170-31 and 170-32 to 170-3n correct the transmission channel coefficients calculated by the transmission channel coefficient calculation units 130-1 and 130-2 to 130-n using the following formula (3) based on the reception channel coefficients and the extrapolation distances, such that the absolute values are matched with the threshold.

[Formula 3]

$$\hat{H}_i = H_i + \left( L \times \frac{dH_i}{df} \right) \quad (3)$$

P provided that
$\hat{H}_i$: complex channel coefficient after correction
$H_i$: complex channel coefficient in reception frequency band
L: extrapolation distance calculated by extrapolation distance calculation unit
$dH_i/df$: variation of complex channel coefficient in reception frequency band in direction of frequency Next, the correcting operation of the transmission channel coefficient according to the third embodiment is described with reference to FIG. 6.

Figure 6:
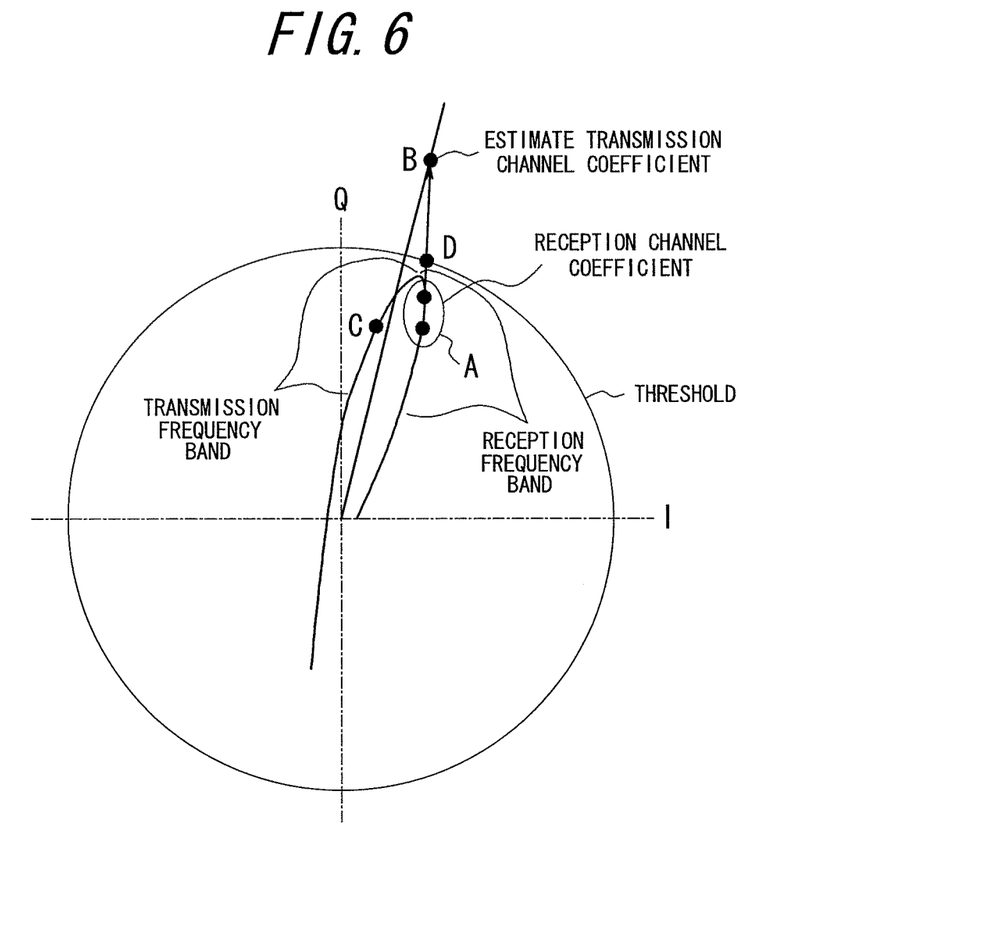
FIG. 6 is a diagram illustrating an example of the distribution of the reception channel coefficients and the transmission channel coefficients in the direction of frequency on the complex plane, for explaining a correcting operation of the transmission channel coefficient according to the third embodiment.

Such a calculation (estimation) of the transmission channel coefficient as the above case 1 means that the transmission channel coefficient in the frequency band is estimated (calculated) as a point B in FIG. 6 from a distribution of the reception channel coefficients in the reception frequency band shown as a part A in FIG. 6. In this case, if a point C in FIG. 6 is a transmission channel coefficient which should be estimated originally, the estimation error between the "actual transmission channel coefficient" and the "estimated (calculated) transmission channel coefficient" corresponds to the distance between the point B and the point C, which is a significant estimation error.

As the countermeasure, according to the third embodiment of the present invention to correct the transmission channel coefficient, the transmission channel coefficient correction units 170-31 and 170-32 to 170-3n, when the transmission channel coefficients such as the point B in FIG. 6 are estimated (calculated), correct the transmission channel coefficients calculated by the transmission channel coefficient calculation units 130-1 and 130-2 to 130-n using the formula (3) (namely, correct them to a point D in FIG. 6 which corresponds to the threshold), based on the extrapolation distances and variations of the complex channel coefficients at reception, while holding phase components of the transmission channel coefficients. Thereby, it is possible to minimize the estimation error to the distance between the point D and the point C.

According to the third embodiment, by correcting the absolute value of the transmission channel coefficient which is considered to occur with a low probability, among the absolute values of the transmission channel coefficients calculated (estimated) by extrapolation (linear extrapolation, for example), it is possible to reduce the calculation error (estimation error) of the transmission channel coefficient. Since the calculation error (estimation error) of the transmission channel coefficient is minimized, it is possible to improve the calculation accuracy (estimation accuracy) of the transmission channel coefficient in the transmission frequency band. Hence, it is possible to obtain good communication quality by preventing deterioration of communication quality caused by the significant difference between the uplink and downlink frequencies due to broadbandization in communications.

[Fourth Embodiment]

Figure 7:
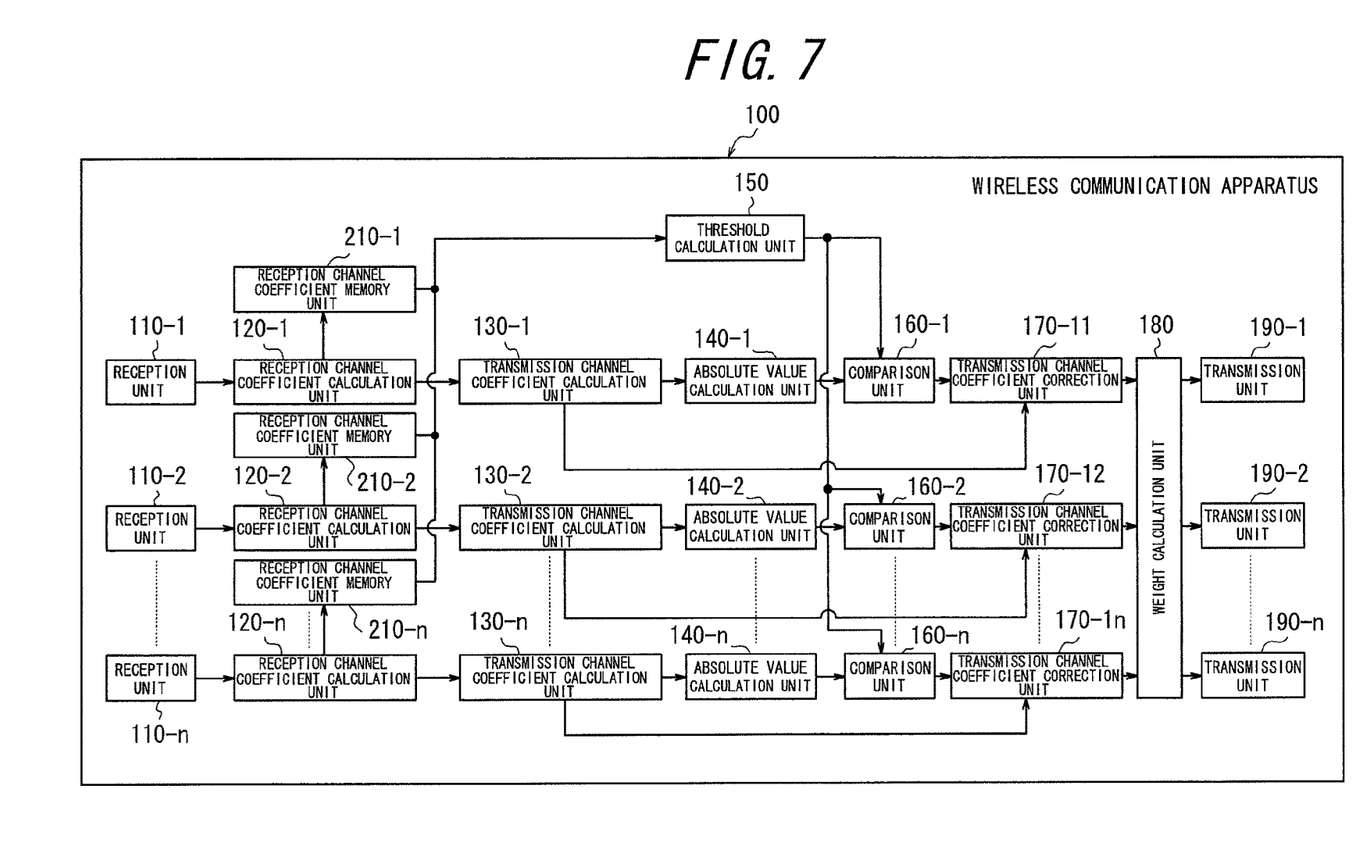
FIG. 7 is a block diagram illustrating a schematic constitution of a wireless communication apparatus according to a fourth embodiment applying the wireless communication method of the present invention.

FIG. 7 is a block diagram illustrating a schematic constitution of a wireless communication apparatus according to a fourth embodiment applying the wireless communication method of the present invention. A wireless communication apparatus 100 according to the present embodiment has the same constitution as the wireless communication apparatus 100 of the first embodiment, except for having reception channel coefficient memory units 210-1 and 210-2 to 210-$n$ in addition.

Each of the reception channel coefficient memory units 210-1 and 210-2 to 210-$n$ stores reception channel coefficients, at a plurality of time points, calculated by each of the reception channel coefficients calculation units 120-1 and 120-2 to 120-$n$. The threshold calculation unit 150 calculates a greatest absolute value as the threshold, among the absolute values of the reception channel coefficients at the plurality of time points stored in the reception channel coefficient memory units 210-1 and 210-2 to 210-$n$.

According to the fourth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient in the transmission frequency band. Since the calculation error (estimation error) of the transmission channel coefficient is minimized, it is possible to improve the calculation accuracy (estimation accuracy) of the transmission channel coefficient in the transmission frequency band. Moreover, accuracy of the threshold can be improved by calculating the threshold using the absolute values of the reception channel coefficients at the plurality of time points. Hence, it is possible to obtain good communication quality by preventing deterioration of communication quality caused by the significant difference between the uplink and downlink frequencies due to broadbandization in communications.

[Fifth Embodiment]

Figure 8:
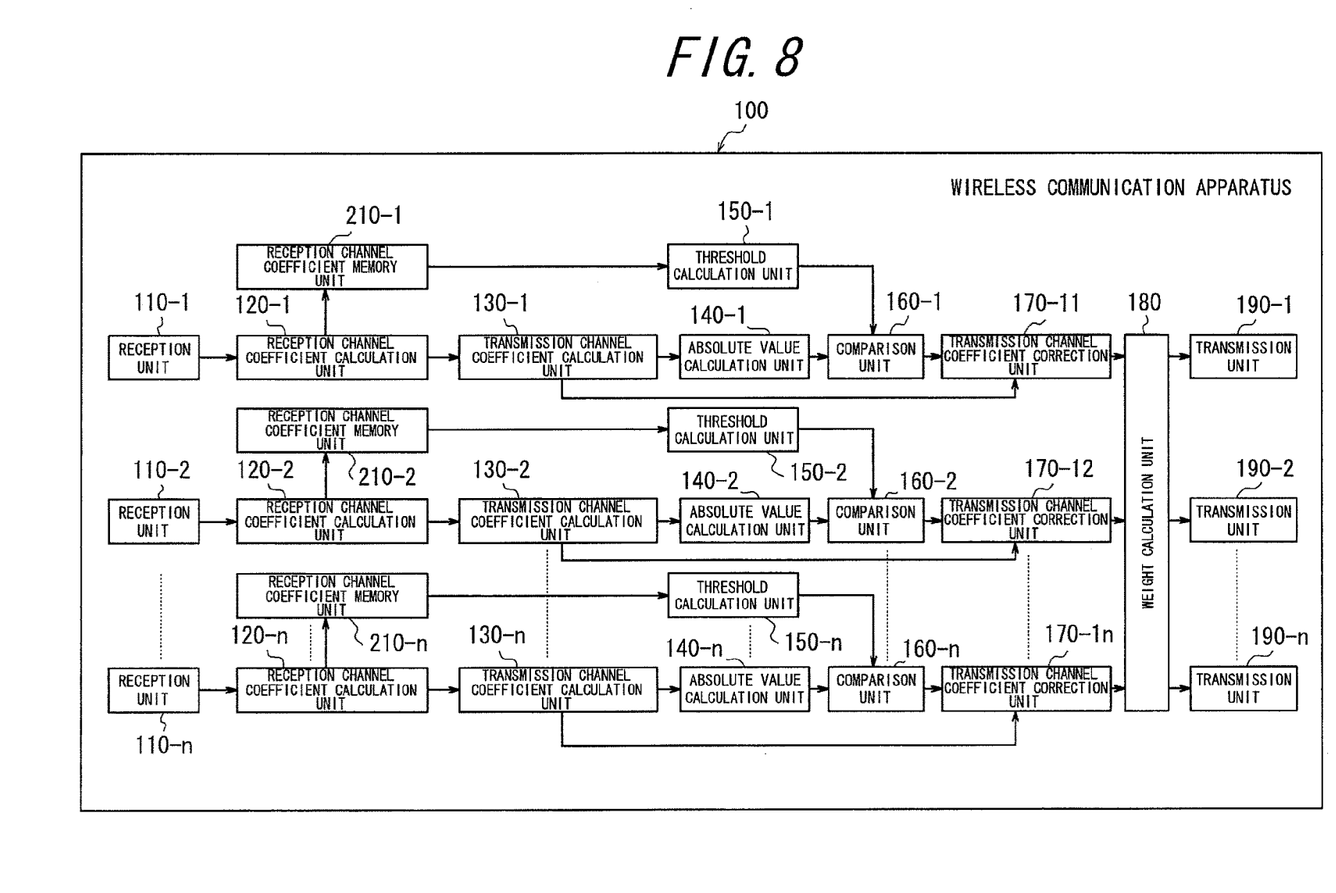
FIG. 8 is a block diagram illustrating a schematic constitution of a wireless communication apparatus according to a fifth embodiment applying the wireless communication method of the present invention.

FIG. 8 is a block diagram illustrating a schematic constitution of a wireless communication apparatus according to a fifth embodiment applying the wireless communication method of the present invention. A wireless communication apparatus 100 according to the present embodiment has the same constitution as the wireless communication apparatus 100 in the above fourth embodiment, except for having threshold calculation units 150-1 and 150-2 to 150-$n$ in place of the threshold calculation unit 150 commonly provided to the reception channel coefficient memory units 210-1 and 210-2 to 210-$n$.

Each of the threshold calculation units 150-1 and 150-2 to 150-$n$ calculates a greatest absolute value as the threshold among the absolute values of the reception channel coefficients at the plurality of time points stored in the reception channel coefficient memory units 210-1 and 210-2 to 210-$n$.

According to the fifth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve the calculation accuracy (estimation accuracy) of the transmission channel coefficient in the transmission frequency band. Moreover, accuracy of the threshold can be improved, as the threshold is calculated using the absolute values of the reception channel coefficients at the plurality of time points. Furthermore, even when the distribution of the reception channel coefficients in relation to the counterpart wireless communication apparatus (terminal) is different for each antenna because of influence of shadowing and the likes, it is possible to correct the absolute value of the transmission channel coefficient efficiently. Hence, it is possible to obtain good communication quality by preventing deterioration of communication quality caused by the significant difference between the uplink and downlink frequencies due to broadbandization in communications.

[Sixth Embodiment]

Figure 9:
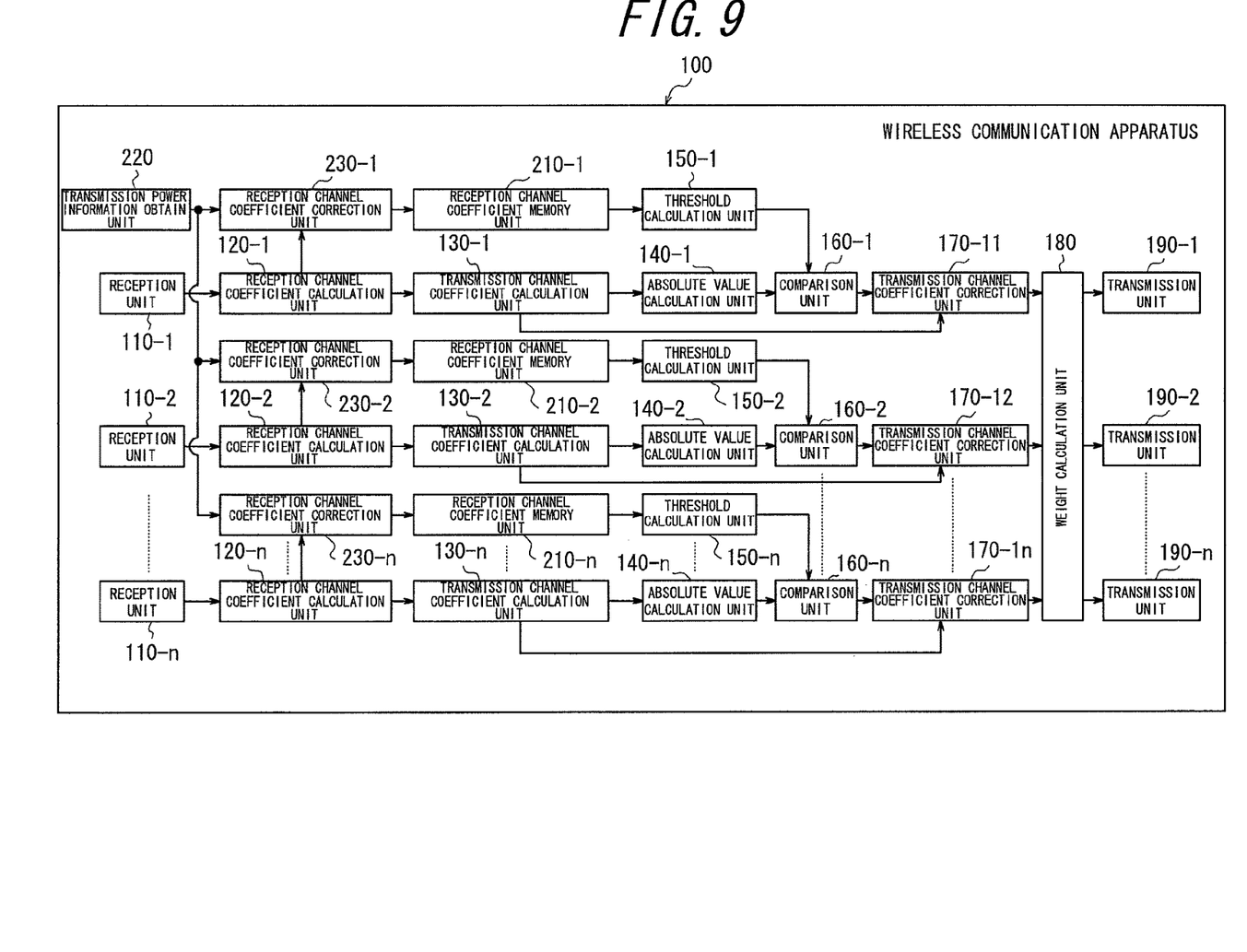
FIG. 9 is a block diagram illustrating a schematic constitution of a wireless communication apparatus according to a sixth embodiment applying the wireless communication method of the present invention.

FIG. 9 is a block diagram illustrating a schematic constitution of a wireless communication apparatus according to a sixth embodiment applying the wireless communication method of the present invention. A wireless communication apparatus 100 according to the present embodiment has the same constitution as the wireless communication apparatus 100 in the above fifth embodiment, except for having a transmission power information obtain unit 220 and reception channel coefficient correction units 230-1 and 230-2 to 230-$n$ in addition.

The transmission power information obtain unit 220 obtains transmission power information from the counterpart wireless communication apparatus (terminal).

The reception channel coefficient correction units 230-1 and 230-2 to 230-$n$ correct reception channel coefficients calculated by the reception channel coefficient calculation units 120-1 and 120-2 to 120-$n$, based on the transmission power information obtained by the transmission power information obtain unit 220. The reception channel coefficient memory units 210-1 and 210-2 to 210-$n$ store the reception channel coefficients corrected by the reception channel coefficient correction units 230-1 and 230-2 to 230-$n$.

According to the sixth embodiment, by correcting the absolute value of the transmission channel coefficient which is considered to occur with a low probability, among the absolute values of the transmission channel coefficients calculated (estimated) by extrapolation (linear extrapolation, for example), it is thus possible to reduce the calculation error (estimation error) of the transmission channel coefficient. Since the calculation error (estimation error) of the transmission channel coefficient is minimized, it is possible to improve the calculation accuracy (estimation accuracy) of the transmission channel coefficient in the transmission frequency band. Moreover, accuracy of the threshold can be improved, as the threshold is calculated using the absolute values of the reception channel coefficients at the plurality of time points. Furthermore, even when transmission power of the counterpart wireless communication apparatus (terminal) changes at each of time points or changes in the direction of frequency, it is possible to correct the absolute value of the transmission channel coefficient. Hence, it is possible to obtain good communication quality by preventing deterioration of communication quality caused by the significant difference between the uplink and downlink frequencies due to broadbandization in communications.

It is to be understood that the thresholds calculated by the threshold calculation units 150, 150-1 and 150-2 to 150-$n$ are not limited to "the greatest absolute value among the absolute values of the reception channel coefficients" but may be a result of addition of a predetermined value to the greatest absolute value or a result of subtraction of a predetermined value from the greatest absolute value. In addition, extrapolation used by the transmission channel coefficient calculation units 130-1 and 130-2 to 130-$n$ for calculation of the transmission channel coefficients is not limited to "linear extrapolation" but may other extrapolation methods.

The invention claimed is:

1. A wireless communication apparatus having a plurality of antennas comprising:
   a reception channel coefficient calculation unit for calculating a reception channel coefficient in a reception frequency band, for each of the plurality of antennas;
   a transmission channel coefficient calculation unit for calculating a transmission channel coefficient in a transmission frequency band, for each of the plurality of antennas, by extrapolation based on a distribution of reception channel coefficients calculated by the reception channel coefficient calculation unit in a direction of frequency; and
   a correction unit, when an absolute value of the transmission channel coefficient is greater than a threshold calculated based on the reception channel coefficient, for correcting the transmission channel coefficient calculated by the transmission channel coefficient calculation unit such that the absolute value is matched with the threshold.

2. The wireless communication apparatus according to claim 1, wherein the correction unit corrects the absolute value of the transmission channel coefficient while holding a phase component of the transmission channel coefficient calculated by the transmission channel coefficient calculation unit.

3. The wireless communication apparatus according to claim 1, further comprising an extrapolation distance calculation unit for calculating an extrapolation distance based on the reception channel coefficient calculated by the reception channel coefficient calculation unit, the transmission channel coefficient calculated by the transmission channel coefficient calculation unit and the threshold,
   wherein the correction unit corrects the transmission channel coefficient calculated by the transmission channel coefficient calculation unit based on the extrapolation distance calculated by the extrapolation distance calculation unit and the reception channel coefficient calculated by the reception channel coefficient calculation unit.

4. The wireless communication apparatus according to claim 1, further comprising a channel coefficient memory unit for storing reception channel coefficients at a plurality of time points, for each of the plurality of antennas, calculated by the reception channel coefficient calculation unit,
   wherein the threshold is calculated based on the reception channel coefficients at the plurality of time points stored in the channel coefficient memory unit.

5. The wireless communication apparatus according to claim 1, wherein the threshold is calculated for each of the plurality of antennas, and
   the correction unit corrects the transmission channel coefficient based on a result of a comparison between the threshold of each of the plurality of antennas and the absolute value of each of the plurality of antennas.

6. The wireless communication apparatus according to claim 1, further comprising a transmission power information obtain unit for obtaining transmission power information of a counterpart wireless communication apparatus and a reception channel coefficient correction unit for correcting the reception channel coefficient calculated by the reception channel coefficient calculation unit,
   wherein the reception channel coefficient correction unit corrects the reception channel coefficient calculated by the reception channel coefficient calculation unit, based on the transmission power information obtained by the transmission power information obtain unit.

7. The wireless communication apparatus according to claim 1, wherein
   the wireless communication apparatus is used for a system in which the transmission frequency band and the reception frequency band are different from each other.

8. A wireless communication method for controlling wireless communication between a wireless communication apparatus having a plurality of antennas and a counterpart wireless communication apparatus, comprising:
   a reception channel coefficient calculation step for calculating a reception channel coefficient in a reception frequency band, for each of the plurality of antennas;
   a transmission channel coefficient calculation step for calculating a transmission channel coefficient in a transmission frequency band, for each of the plurality of antennas, by extrapolation based on a distribution of reception channel coefficients calculated at the reception channel coefficient calculation step in a direction of frequency; and
   a correction step, when an absolute value of the transmission channel coefficient is greater than a threshold calculated based on the reception channel coefficient, for correcting the transmission channel coefficient calculated at the transmission channel coefficient calculation step such that the absolute value is matched with the threshold.

* * * * *